United States Patent
Döring

(10) Patent No.: US 8,171,727 B2
(45) Date of Patent: *May 8, 2012

(54) DEVICE FOR REDUCING DIBENZODIOXIN EMISSIONS, DIBENZOFURAN EMISSIONS AND PARTICLE EMISSIONS

(75) Inventor: Andreas Döring, Munich (DE)

(73) Assignee: MAN Truck & Bus AG, München (DE)

( * ) Notice: Subject to any disclaimer, the term of this patent is extended or adjusted under 35 U.S.C. 154(b) by 668 days.

This patent is subject to a terminal disclaimer.

(21) Appl. No.: 12/355,922

(22) Filed: Jan. 19, 2009

(65) Prior Publication Data

US 2009/0199546 A1 Aug. 13, 2009

(30) Foreign Application Priority Data

Feb. 12, 2008 (DE) .................. 10 2008 008 785

(51) Int. Cl.
*F01N 3/10* (2006.01)
*B01D 47/00* (2006.01)

(52) U.S. Cl. .......... 60/302; 423/210; 423/212; 422/171; 422/173; 422/177; 422/180; 60/300; 60/301

(58) Field of Classification Search .................. 423/210, 423/212; 60/299, 300, 301, 302; 422/171, 422/173, 177, 180
See application file for complete search history.

(56) References Cited

U.S. PATENT DOCUMENTS

| | | | |
|---|---|---|---|
| 4,170,571 A | 10/1979 | Ritscher | |
| 4,902,487 A | 2/1990 | Cooper | |
| 4,999,173 A | 3/1991 | Kamiyama | |
| 5,017,538 A | 5/1991 | Takeshima | |
| 5,024,981 A | 6/1991 | Speronello | |
| 7,357,900 B2 * | 4/2008 | Bartley et al. | 422/168 |
| 7,506,504 B2 * | 3/2009 | Kumar | 60/299 |
| 7,802,419 B2 * | 9/2010 | Doring | 60/286 |
| 7,850,934 B2 * | 12/2010 | Doring | 423/212 |
| 7,856,809 B2 * | 12/2010 | Doring | 60/295 |
| 7,998,423 B2 * | 8/2011 | Boorse et al. | 422/180 |
| 2002/0054844 A1 | 5/2002 | Pfeifer | |
| 2005/0031514 A1 | 2/2005 | Patchett | |
| 2008/0202107 A1 * | 8/2008 | Boorse et al. | 60/301 |

FOREIGN PATENT DOCUMENTS

| | | |
|---|---|---|
| DE | 3428232 | 2/1986 |
| DE | 19618397 A1 | 11/1997 |
| DE | 10327030 | 1/2005 |
| EP | 1072765 | 1/2001 |
| JP | 2004376102 | 7/2006 |

* cited by examiner

Primary Examiner — Nina Bhat

(74) Attorney, Agent, or Firm — Cozen O'Connor

(57) ABSTRACT

A transition metal-containing catalyzer is arranged on a particle filter installed in the exhaust gas line of an internal combustion engine and cannot be separated therefrom without being destroyed. To reduce emissions, at least one molecular sieve which retains polychlorinated dibenzodioxins and polychlorinated dibenzofurans is arranged between the transition metal-containing catalyzer and the exhaust gas outlet. Further, the input side of the molecular sieve and/or the output side of the catalyzer has an oxidation activity for hydrocarbons, polychlorinated dibenzodioxins and polychlorinated dibenzofurans upstream of the molecular sieve.

23 Claims, 3 Drawing Sheets

DEVICE FOR REDUCING DIBENZODIOXIN EMISSIONS, DIBENZOFURAN EMISSIONS AND PARTICLE EMISSIONS

BACKGROUND OF THE INVENTION

1. Field of the Invention

The subject matter of the invention is a device for reducing dibenzodioxin emissions, dibenzofuran emissions and particle emissions in lean-burn internal combustion engines such as diesel engines and gasoline engines with direct injection.

2. Description of the Related Art

Along with solids particles, nitric oxides are some of the limited components of exhaust gas which are formed during combustion processes. Permissible emissions of these components continue to be lowered. At present, various methods are employed to minimize these exhaust gas components in internal combustion engines for motor vehicles. Reduction of nitric oxides is usually accomplished by means of catalyzers; reducing agents are additionally required in oxygen-rich exhaust to increase selectivity and $NO_X$ conversion. These methods have come to be known under the umbrella term of SCR (Selective Catalytic Reduction) methods. They have been used for many years in the energy industry and more recently in internal combustion engines. A detailed exposition of these methods is given in DE 34 28 232 A1. $V_2O_5$-containing mixed oxides, e.g., in the form of $V_2O_5/WO_3/TiO_2$, can be used as SCR catalysts. $V_2O_5$ proportions typically range between 0.2% and 3%. In practical applications, ammonia or compounds which split off ammonia such as urea or ammonia formiate are used in solid state or in solution as reducing agents. One mole of ammonia is needed to convert one mole of nitrogen monoxide.

$$4NO + 4NH_3 + O_2 \Rightarrow 4N_2 + 6H_2O \quad (1)$$

When a platinum-containing NO oxidation catalyzer for forming $NO_2$ is positioned in front of the SCR catalyzers $$2NO + O_2 \Leftrightarrow 2NO_2 \quad (2)$$

the SCR reaction is accelerated considerably and the low-temperature activity is markedly increased.

$$NO + 2NH_3 + NO_2 \Rightarrow 2N_2 + 3H_2O \quad (3)$$

Nitric oxide reduction using the SCR method in internal combustion engines operating in vehicles is difficult because of the changing operating conditions, which makes it difficult to apportion the reducing agent. On the one hand, the greatest possible conversion of nitric oxides must be achieved; but on the other hand emission of unspent ammonia must be prevented. This problem is often solved by using an ammonia blocking catalyzer downstream of the SCR catalyzer to convert the excess ammonia to nitrogen and water vapor.

Particle separators, as they are called, or particle filters are used in power plants and vehicles to minimize fine particles.

A typical arrangement with particle separators for use in vehicles is described, for example, in EP 1 072 765 A1. Arrangements of this kind differ from those using particle filters in that the diameter of the channels in the particle separator is substantially greater than the diameter of the largest occurring particle, while the diameter of the filter channels in particle filters is in the range of the diameter of the particles.

Due to this difference, particle filters are subject to blockage, which increases the exhaust gas counterpressure and lowers engine performance. An arrangement and a method with particle filters are shown in U.S. Pat. No. 4,902,487. A distinguishing feature of the two above-mentioned arrangements and methods is that the oxidation catalyzer—usually a catalyzer with platinum as active material—arranged upstream of the particle separator or particle filter oxidizes the nitrogen monoxide in the exhaust gas to form nitrogen dioxide according to equation (2) by means of the residual oxygen which is also contained. In this regard, it must be ensured that the equilibrium of the aforementioned reaction lies on the side of NO at high temperatures. As a result, the achievable $NO_2$ proportions are limited at high temperatures due to this thermodynamic limitation.

This $NO_2$ is in turn converted in the particle separator or particle filter with the carbon particles to form CO, $CO_2$, $N_2$ and NO.

There is a continuous removal of the deposited fine particles by means of the powerful oxidizing agent $NO_2$, so that regeneration cycles such as those which must be laboriously carried out in other arrangements are dispensed with. For this reason, this is referred to as "passive" regeneration.

$$2NO_2 + C \Rightarrow 2NO + CO_2 \quad (4)$$

$$NO_2 + C \Rightarrow NO + CO \quad (5)$$

$$2C + 2NO_2 \Rightarrow N_2 + 2CO_2 \quad (6)$$

If the $NO_2$ does not succeed in effecting a complete oxidation of the carbon embedded in the particle filter, the carbon proportion and, therefore, the exhaust gas counterpressure increases.

At the present time, this is prevented by providing the particle filters with a catalytic coating for the oxidation of NO. As was already stated above, these catalyzers usually contain platinum. The disadvantage of this method is that the $NO_2$ formed at the particle filter can only be used for oxidation of particles which have been separated out downstream of the catalytically active layer for NO oxidation, that is, inside the filter medium. However, if a layer of separated particles, or a filter cake as it is called, should form on the filter surface and, therefore, on the catalytically active layer, the NO oxidation catalyzer lies downstream of the filter cake so that the soot particles separated out at that location cannot be oxidized by means of $NO_2$ from the NO oxidation catalyzer arranged on the particle filter.

In addition, only the catalyzer layer arranged on the raw gas side contributes, strictly speaking, to the performance of the system because the $NO_2$ that is formed catalytically on the purified gas side can no longer come into contact with the soot deposited on the raw gas side and inside the filter material.

Another problem arising from the coating of the particle filter is that the geometric surfaces of the filter are appreciably smaller than those of the catalyzer substrates that are normally used. The reason for this is that the filters require relatively large free cross sections and, therefore, free volume on the raw gas side so that soot and engine oil ashes can be embedded. When ceramic filter substrates are used, this is implemented by means of a low porosity of 50 cpsi to 200 cpsi. On the other hand, simple catalyzers are usually constructed with cell densities of 400 cpsi to 900 cpsi. An increase from 50 cpsi to 900 cpsi results in an increase in the geometric surface from 1 $m^2/l$ to 4 $m^2/l$, which makes possible substantially increased conversion at the catalyzers.

For these reasons, an NO oxidation catalyzer cannot be omitted in front of the particle filter in spite of the catalytic coating of the filter. This leads to a relatively large structural volume. This is the case even when the NO oxidation catalyzer and particle filters form a constructional unit by constructing the input area of the particle filter as an NO oxidation catalyzer (DE10327030 A1).

Although these steps allow soot oxidation up to temperatures of 250° C., there are applications in which even these exhaust gas temperatures cannot be reached and, therefore, reliable functioning of the particle filters cannot be ensured. This normally occurs in lightly loaded engines installed in vehicles, for example, in passenger cars, public buses, and garbage collection trucks, which, moreover, also have high idling proportions.

Therefore, a second possibility for particle filter regeneration is applied especially in these cases: this consists in actively raising the exhaust gas temperature. Usually this is accomplished by adding hydrocarbons upstream of oxidation catalyzers. The exothermal oxidation of the hydrocarbons at the catalyzers leads to an appreciable rise in temperature.

When the temperature is successfully increased to more than 600° C. in this way, the carbon is oxidized by means of oxygen.

$$C + O_2 \Rightarrow CO_2 \qquad (7)$$

However, the risk in this so-called "active" filter regeneration is that the burning of the soot will lead to a sharp rise in temperature of up to 1000° C. and, therefore, usually to damage to the particle filter and/or catalyzers arranged downstream.

Since the temperature increase must be maintained for several minutes to ensure a quantitative oxidation of the soot particles, the need for hydrocarbons is significant and, because the fuel in the internal combustion engine is usually used as a source of hydrocarbons, its efficiency is impaired.

The addition of hydrocarbons can be carried out by means of a separate injection nozzle arranged in the exhaust system. Another possibility is to generate high hydrocarbon emissions by means of a delayed after-injection of fuel into the combustion chamber.

In order to meet future exhaust gas regulations, it will be necessary to use arrangements for reducing nitric oxide emissions and arrangements for reducing fine particles emissions at the same time.

One solution is to coat the particle filter with SCR-active material (JP 2004-376102) or impregnate it with SCR-active material so that the particle filter and the SCR catalyzer form a nonreversible unit, that is, they cannot be separated from one another without being destroyed. In this connection, the use of $V_2O_5$ as an SCR-active component is difficult. This is due to the poor thermal stability of these catalyzers. Exhaust gas temperatures of more than 650° C. lead to sublimation of $V_2O_5$. Since these temperatures can easily occur in particle filters, as was already mentioned above, $V_2O_5$-free catalyzers containing transition metals, especially iron-, cobalt-, or copper-containing catalyzers, are used for these high-temperature applications. The integration of these transition metals through ion exchange in zeolites has proven to be particularly advantageous in this connection (U.S. Pat. No. 5,017,538). In this way, because of the very large surface of the zeolites, it is possible to substantially enlarge the active surface and accordingly appreciably increase the achievable throughput.

The disadvantage of these transition metal-containing catalyzers, however, is that they form highly toxic polychlorinated dibenzodioxins (PCDD) and polychlorinated dibenzofurans (PCDF) in the presence of chloride and hydrocarbons in the temperature range between 200° C. and 400° C.

In the vehicle, the chloride needed for dioxin formation reaches the exhaust gas and, accordingly, the catalyzers, e.g., through biofuels, the engine oil, or the intake air (salt spraying in winter, driving in coastal regions). The hydrocarbons needed for the formation of PCDD and PCDF are contained in the exhaust gas in any case because of incomplete combustion of the fuel.

SUMMARY OF THE INVENTION

It is an object of the invention to reduce PCDD emissions and PCDF emissions as well as the emissions of particles and, as the case may be, $NO_X$ in devices having a transition metal containing catalyzer.

The device according to the invention solves the problem of the emission of polychlorinated dibenzodioxins and polychlorinated dibenzofurans formed on at least one transition metal-containing catalyzer, wherein the transition metal-containing catalyzer is arranged on a particle filter that is built into the exhaust line in an internal combustion engine and cannot be separated from it without being destroyed.

The basic idea is to provide outfitting the particle filters with a transition metal-containing catalyzer, e.g., an SCR catalyzer, while preventing emissions of PCCD and PCDF formed on the latter. This is advantageously carried out in that the device has, in the direction of the purified gas side and downstream of the transition metal-containing catalyzer, a molecular sieve, e.g., a layer acting as a molecular sieve, through which the exhaust gas must pass. The pore diameters of the molecular sieve are so designed that the large PCDD molecules and PCDF molecules cannot pass through them, whereas it is possible for the smaller, harmless exhaust gas constituents such as oxygen, nitrogen, carbon dioxide, nitric oxides, water, and carbon monoxide to pass.

This works because the smaller, harmless exhaust gas constituents have diameters of 1.5 Å to 3 Å, while the diameters of the aromatic hydrocarbons, dioxins and furans are in the range of 12 Å to 26 Å, i.e., the pore diameters of the molecular sieve are advantageously selected between 3 Å and 12 Å.

The defined pore diameters of the molecular sieve can be implemented relatively simply and, therefore, advantageously through the use of zeolites. Different lattice constants, structures and, therefore, channel cross sections can be generated through the specific arrangement of $AlO_4$— and $SiO_4$-tetrahedra. Further, it is possible to use silicates, metal silicates, aluminates, metal aluminates, silicophosphates, metal silicophosphates, silicoaluminophosphates, aluminophosphates, metal aluminophosphates, and aluminum silicates for the molecular sieve.

The following framework types have proven to be particularly advantageous for the molecular sieve: AEN, OSI, EPI, ERI, FER, FAU, OFF, MFI, LTL, VFI, MAZ, MEI, EMT, CHA, KFI, BEA, MFS, MEL, MTW, EUO, MTT, HEU, FER, TON and MOR. The above-mentioned designations conform to the IZA (International Zeolite Association) nomenclature.

When the molecular sieve is constructed as a zeolite, the above-mentioned framework structures include the following zeolites: Mordenite, Epistilbite, Chabazite, Erionite, Mazzite, Ferrierite, Faujasite, Offretite, ZSM-3, ZSM-4, ZSM-5, ZSM-12, ZSM-18, ZSM-20, ZSM-22, ZSM-23, ZSM-34, ZSM-35, ZSM-38, ZSM-48, ZSM-50, Omega, Beta, Zeolite A, Zeolite L, Zeolite Y, Zeolite X, ZK-4, ZK-5, ZK-14, ZK-20, ZK-21 and ZK-22. Therefore, the zeolites mentioned above can advantageously be used individually or in any combination to generate the molecular sieve.

The average thickness of the molecular sieve or molecular sieve layer should be at least 3 Å to ensure a sufficient retention of the PCDD molecules and PCDF molecules. At the same time, the thickness should not exceed 5 μm because otherwise there would be a considerable increase in the exhaust gas counterpressure. In contrast, the layer thickness of the catalyzer layer in a catalyzer realized by means of coating is between 5 μm and 500 μm.

To improve the $NO_X$-conversion in the catalyzer, it is useful to integrate the active component(s) copper and/or iron and/or cobalt in a zeolite matrix. However, when the catalyzer layer and molecular sieve layer are realized by means of zeolites it must be ensured that the molecular sieve layer, if any, contains only small amounts of copper, iron or cobalt Since copper has a higher PCDD formation rate than iron, it may be useful to combine a copper-containing catalyzer layer and an iron-containing molecular sieve layer.

Also, it must be considered that the exhaust gas, in contrast to the molecular sieve or molecular sieve layer, should not be forced through the zeolite pores of the catalyzer layer. Rather, it should stream past the latter and the reactants should only penetrate into the zeolite pores by diffusion processes because, otherwise, the exhaust gas counterpressure would be substantially increased due to the large layer thickness.

This can be achieved, for example, through a high porosity of the transition metal-containing catalyzer layer. A high porosity of this kind can be generated, for example, by mixing filler into the washcoat, which filler evaporates during calcination, or by mixing in zeolite-free, highly-porous washcoat additives or zeolite types with a high porosity and/or large pore diameter. Another possibility with respect to highly porous filter substrates would be to apply a thin coating to the filter material that does not completely cover or close the filter material so that free flow channels would still remain inside the filter substrate after coating.

Through all of these steps, the reactants penetrate into the zeolite pore structure of the catalyzer as the result of diffusion processes, not as the result of convection processes.

In view of the above-mentioned set of problems associated with counterpressure, the zeolite types of the catalyzer and those of the molecular sieve or molecular sieve layer are usually different. In particular, the pore diameters of the molecular sieve or molecular sieve layer are smaller than those of the catalyzer layer. For this reason, zeolites with the MFI and/or BEA framework structures are generally used.

The production of zeolite-containing catalyzers is described in U.S. Pat. Nos. 5,017,538; 4,999,173 and 4,170,571 and is therefore known.

In general, dioxins, furans and long-chain hydrocarbons must be prevented from accumulating on the molecular sieve or molecular sieve layer thereby leading to blockage of the sieve. Therefore, the system comprising particle filter, transition metal-containing catalyzer such as is used, e.g., for the SCR reaction, and molecular sieve must be provided with an oxidizing activity for PCDD, PCDF and hydrocarbons. This can be accomplished in an advantageous manner in several ways.

On one hand, it is possible to arrange an additional layer between the transition metal-containing catalyzer, e.g., SCR catalyzer, and the molecular sieve or molecular sieve layer, which additional layer contains active components having an oxidizing activity for PCDD, PCDF and hydrocarbons. The porosity of this layer should be adjusted similar to that of the particle filter or transition metal-containing catalyzer.

On the other hand, it is possible to additionally provide the molecular sieve or molecular sieve layer, at least at their surface facing the transition metal-containing catalyzer, e.g., SCR catalyzer, with active components which enable oxidation of PCDD, PCDF and hydrocarbons.

Since the hydrocarbons, dioxins and furans cannot pass through the molecular sieve or molecular sieve layer, the retention time in the area of the material causing the oxidation is long enough for a decomposition to occur.

Due to the high steam pressures within the pore structure, the sublimation temperatures are increased considerably when the elements causing the oxidation of hydrocarbons, PCDDs and PCDFs are integrated in a zeolite structure, so that vanadium can even be used within the molecular sieve or molecular sieve layer up to 750° C.

Another possibility for providing the arrangement with a hydrocarbon-oxidizing, PCDD-oxidizing and PCDF-oxidizing activity on the arrangement would be to provide the transition metal-containing catalyzer, e.g., SCR catalyzer, with an oxidation activity for hydrocarbons, dioxins and furans. Since dioxins, furans and hydrocarbons cannot exit the transition metal-containing catalyzer through the molecular sieve layer, the retention time of these substances in the catalyzer is very long and even low oxidation activity is sufficient to cause the decomposition of the hydrocarbons, dioxins and furans.

In all three of the possibilities mentioned above, active components for oxidation of hydrocarbons, chlorinated dioxins and chlorinated furans apart from vanadium, mentioned above, include other transition metals such as tungsten, titanium, lanthanum, molybdenum, cerium, or manganese as well as elements belonging to the platinum group of metals. However, it must be ensured when adding these elements to transition metal-containing catalyzers that the activity of the catalyzer for converting other exhaust gas components is not impaired. This is especially critical in SCR methods because oxidation of ammonia must be avoided. Otherwise, there would no longer be a sufficient amount of $NH_3$ available for reducing the nitric oxides according to equations 1 and 3.

In an advantageous manner, the arrangement can be produced so that the transition metal-containing catalyzer is arranged on a ceramic or metal particle filter initially by means of a coating, possibly multiple coatings. After the drying and/or calcination of the catalyzer, the molecular sieve oxidation layer and/or hydrocarbon oxidation layer, PCDD oxidation layer and PCDF oxidation layer are formed in another work step. A number of different methods can be chosen for this purpose.

For one, a molecular sieve layer can be arranged on the side of the filter walls and/or of the transition metal-containing catalyzer facing the purified gas side is possible in a manner similar to the coating of substrates with a catalyzer washcoat. This layer must then be dried and calcinated similar to the catalyzers to ensure a stable, firm connection between the molecular sieve layer, filter substrate and transition metal-containing catalyzer. When zeolites are used for the molecular sieve layer, the coating can be carried out by means of a zeolite-containing suspension.

The molecular sieve layer can contain, in addition, active components enabling an oxidation of hydrocarbons and/or PCDD and PCDF. As was already mentioned above, elements belonging to the platinum group of metals, tungsten, titanium, lanthanum, molybdenum, cerium, manganese, or vanadium can be used in an advantageous manner. Naturally, the oxidation of hydrocarbons, PCDD and PCDF takes place only at the surface of the molecular sieve layer remote of the purified gas side because the hydrocarbon molecules, PCDD molecules and PCDF molecules cannot penetrate into the molecular sieve layer.

An additional layer with oxidation activity for hydrocarbons, PCDD and PCDF can be arranged between the transition metal-containing catalyzer, e.g., SCR catalyzer, and the molecular sieve layer in a manner analogous to the construction of the molecular sieve layer by coating the side of the filter walls and/or of the transition metal-containing catalyzer that faces the purified gas side. The average thickness of a layer applied in this manner is usually between 0.5 μm and 5 μm.

Another advantageous possibility is to impregnate the transition metal-containing catalyzer, e.g., SCR catalyzer, in direction of the purified gas side with the desired active components for oxidation of hydrocarbons, PCDD and PCDF.

Further, is also possible to exchange the concentration of at least one transition metal at the catalyzer surface facing the purified gas side with a different ion possessing oxidation activity with respect to hydrocarbons, PCDD and PCDF through ion exchange in order to produce a particularly thin hydrocarbon oxidation layer, PCDD oxidation layer or PCDF oxidation layer, especially when using zeolite-containing catalyzers. In the simplest case, this is accomplished by introducing an acidic fluid. In so doing, the transition metal ions in the zeolite structure are replaced by protons from the acidic fluid. Subsequently, the protons are in turn exchanged for metal cations with oxidizing activity. As was already described above, elements belonging to the platinum group of metals, tungsten, titanium, lanthanum, molybdenum, cerium, manganese, or vanadium can be used for this purpose. Depending on the affinity of these elements, the intermediate step of protonization can be omitted and the transition metals can be directly replaced by other metals through selection of a suitable pH. Extremely thin constructions are made possible by means of oxidation layers produced through ion exchange; their average layer thickness is usually between 3 Å and 1 μm.

The formation of the molecular sieve layer described above follows all three of the production methods for forming the hydrocarbon oxidation layer, PCDD oxidation layer or PCDF oxidation layer.

Substrates of metal and/or sintered metal and/or ceramic and/or foam and/or ceramic fibers and/or quartz fibers and/or glass fibers and/or silicon carbide and/or aluminum titanate can be used as particle filters.

If it is not possible to arrange the molecular sieve layer on the filter wall, the molecular sieve could also be arranged inside the throughflow filter area on the purified gas side. In honeycomb filters whose inlet channels and outlet channels are alternately closed, this is advantageously carried out by closing the outlet channels with a molecular sieve. This molecular sieve can be arranged on a carrier structure, e.g., as a layer, to improve mechanical stability.

The disadvantage in this method is the small throughflow surface of the molecular sieve which results in high exhaust gas counterpressures. Therefore, a separate structural component part could also be formed as a molecular sieve and its throughflow surfaces are increased by special shaping. This is carried out, for example, by means of a honeycomb structure with parallel flow channels which are alternately closed similar to a ceramic particle filter substrate. In this way, the exhaust gas flow is forced through the walls of the substrate. The walls can be made entirely of molecular sieve material, but because of the required small layer thickness of the molecular sieve it is advantageous in practice to fashion the walls from a porous carrier material and then coat them with the molecular sieve material subsequently.

Although the preceding description emphasizes catalyzers for selective catalytic reduction, the method can be applied to all catalyzers in which formation of PCDD and/or PCDF is observed.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
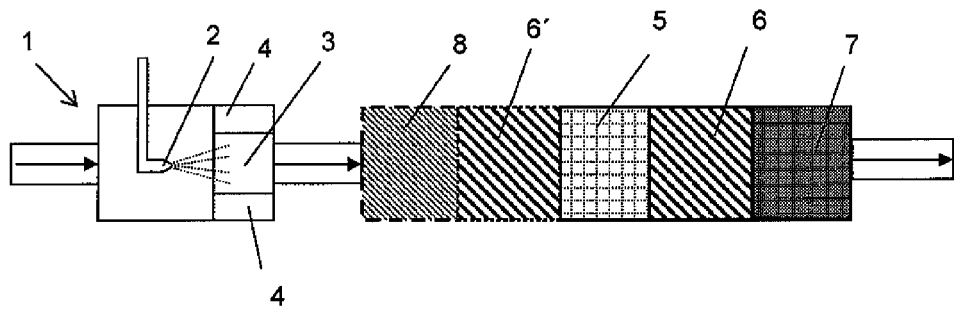
FIG. 1 shows a basic construction of a transition metal-containing SCR system with a downstream molecular sieve.

An exhaust gas after-treatment system for selective catalytic reduction and for the reduction of solids particles in the exhaust gas of an internal combustion engine is shown schematically in FIG. 1. The exhaust gases, symbolized by the arrows in FIG. 1, which are generated by the combustion processes in an internal combustion engine (not shown) initially enter an exhaust gas processing system 1 in which a reducing agent is added to the hot exhaust gas as close to the engine as possible. As is common practice in motor vehicles with SCR catalyzers, the reducing agent is an aqueous urea solution but, of course, it is also possible to add urea in solid form as has already been extensively described in the pertinent technical literature. Further, it is possible to add ammonia as a reducing agent which is obtained at another place, e.g., under more favorable thermal conditions, from a material which splits off ammonia. Depending on the operating parameters of the internal combustion engine, apportionment is controlled by a motor control unit (not shown) in such a way that the aqueous urea solution is injected into an exhaust gas flow by a nozzle 2. An oxidation catalyzer 4 is arranged parallel to the exhaust gas flow 3 and serves to oxidize a portion of the nitrogen monoxide contained in the exhaust gas to form nitrogen dioxide according to equation (2) by means of the excess oxygen present in the exhaust gas. The nitrogen dioxide generated in this way is used in the reduction of solids particles on the one hand and in the subsequent SCR reaction on the other hand as will be described more fully in the following.

A particle filter 5 which accumulates the soot particles found in the exhaust gas is arranged downstream of the exhaust gas flow 3 and oxidation catalyzer 4 arranged parallel to the latter. The soot particles which are held in the particle filter 5 in this way are continuously converted to carbon monoxide, carbon dioxide, nitrogen and nitrogen monoxide through the nitrogen dioxide generated upstream by the oxidation catalyzer 4 so that laborious regeneration cycles for the particle filter 5 can be dispensed with.

The actual selective catalytic reduction of nitric oxides is carried out by means of an SCR catalyzer 6 which is shown schematically in FIG. 1 as a separate structural component part for the sake of simplicity but which, as will be explained in the following, is constructed according to the invention as an SCR-active coating or impregnation of the particle filter 5. In the reduction reaction mentioned above, the largest possible proportion of nitric oxides ($NO_x$) present in the exhaust gas should be converted into nitrogen and water vapor accompanied by a highly selective reduction without any excess ammonia ($NH_3$) remaining in the exhaust gas flow. During the above-mentioned SCR reduction reaction, any residual nitrogen dioxide remaining in the exhaust gas flow is more reactive than the residual NO contained in the exhaust gas and it is accordingly desirable to design the oxidation catalyzer 4 in such a way that the highest possible proportion of nitrogen monoxide is converted to nitrogen dioxide, that is, if possible, more than is necessary for converting the soot particles in the particle separator. The strong exothermal soot oxidation may lead to an appreciable rise in temperature so that temperatures above 650° C. can definitely occur downstream of the particle separator leading to damage to the $V_2O_5$-containing SCR catalyzers. This is why iron-containing, cobalt-containing or copper-containing zeolite materials are usually used as active components.

As was already stated, highly toxic polychlorinated dibenzodioxins (PCDD) and polychlorinated dibenzofurans (PCDF) are formed on transition metal-containing catalyzers in the presence of chloride and hydrocarbons in the temperature range between 200° C. and 400° C. and must not be allowed to exit the exhaust gas system in this form. For this reason, a molecular sieve 7 preventing the emission of dioxins and furans is arranged on the output side of the particle filter 5. In order to prevent blockage of the molecular sieve by dioxins, furans or hydrocarbons, the molecular sieve is provided with oxidizing activity for PCDD and/or PCDF and/or hydrocarbons. This is carried out using tungsten, titanium, lanthanum, molybdenum, cerium, manganese and/or elements of the platinum group of metals.

As shown in FIG. 1 by a dashed line, a hydrolysis catalyzer 8 can be used to improve the splitting off of ammonia from the reducing agent when the temperature level at the location where the reducing agent is fed in is not high enough. This hydrolysis catalyzer 8, which is arranged in the exhaust gas flow downstream of the reducing agent feed location and upstream of the particle filter 5, is shown schematically in the drawing as a separate structural component part, but can also be carried out by charging with correspondingly active catalyzer material on the input side of the particle filter 7.

Further, another SCR catalyzer 6' is shown enclosed by a dotted line in FIG. 1 upstream of the particle filter 5. This can be used in addition to the SCR catalyzer 6. The SCR catalyzer 6' is shown as a separate component but, as will be shown in the following, can be formed by charging with correspondingly active catalyzer material on the input side of the particle filter 5.

Figure 2:
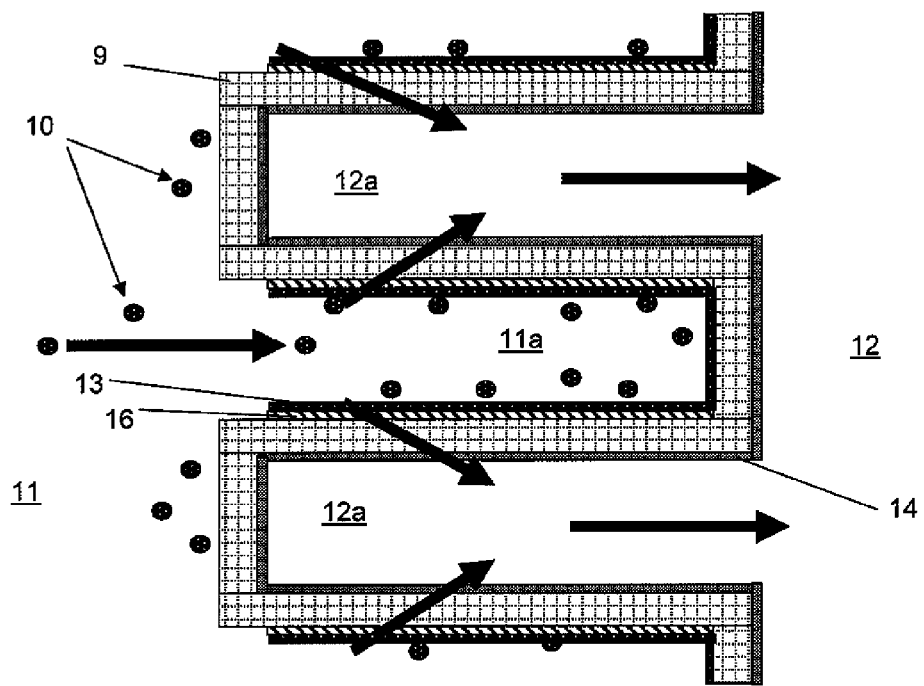
FIG. 2 shows a particle filter with a transition metal-containing catalyzer on the raw gas side and a molecular sieve layer on the purified gas side.

The construction of a particle filter with SCR activity and a blocking and oxidizing action for PCDD and PCDF is shown in FIG. 2, also schematically, in section. The section plane is parallel to the flow direction of the exhaust gas. The flow direction is illustrated by arrows as in FIGS. 3 to 5 which will be described in the following.

The particle filter layer 9 has chambers 11a, 12a shaped as blind holes or pockets on its input side 11 and on its output side 12. The chamber 11a on the input side 11 is open toward the input side 11 and the chamber 12 on the output side 12 is open toward the output side 12. Cordierite, silicon carbide, sintered metal, ceramic fibers, silicate fibers, woven metal, aluminum titanate, or foam can be used as filter material for the particle filter layer 9.

The particle filter layer 9 is provided with a transition metal-containing SCR catalyzer layer 16 on the input side 11 and with a molecular sieve layer 14 on its output side 12.

As can be seen from the drawing, the exhaust gas flow which is laden with soot particles 10, nitric oxides (not shown), ammonia ($NH_3$) (not shown), hydrocarbons, chloride (not shown), and with the precursor substances of PCDD and PCDF impinges on the input side 11 of the particle filter layer 9 and deposits the soot particles 10 particularly in the blind hole-shaped or pocket-shaped chambers 11a as filter cakes 13, while the exhaust gas which is purified of soot particles 10 in this way flows through the filter material to the blind hole-shaped or pocket-shaped chambers 12a on the output side 12. Before reaching the chambers 12a, the $NH_3$-laden exhaust gas flows through the SCR catalyzer layer 16 which is situated on the input side 11 of the particle filter layer 9 and charged with transition metal-containing SCR-active catalyzer material. The selective catalytic reduction according to reactions (1) and (3) in which the nitric oxides are converted to nitrogen and water vapor takes place on the way through the SCR catalyzer layer 16 which is charged with SCR-active catalyzer material. At the same time, highly toxic polychlorinated dibenzodioxins (PCDD) and polychlorinated dibenzofurans (PCDF) are formed on the transition metal-containing SCR catalyzer layer in the presence of chloride and hydrocarbons in the temperature range between 200° C. and 400° C. and must not be allowed to exit the exhaust gas system in this form.

The exhaust gas which is purified of soot particles and nitric oxides in this way but which now contains PCDD and PCDF therefore flows subsequently through the molecular sieve layer 14 which is arranged on the output side—that is, the purified gas side—of the particle filter layer 12 and exits the filter arrangement on the output side 12. As was already described in FIG. 1, the molecular sieve is outfitted with a PCDD oxidation layer, PCDF oxidation layer and/or hydrocarbon oxidation layer and breaks down these substances into harmless decomposition products which can pass through the molecular sieve layer 14 owing to their small molecular size.

The filter cakes 13 must be removed either continuously or periodically to regenerate the particle filter. As was already described referring to FIG. 1, continuous removal of the filter cake 13 is accomplished by arranging an oxidation catalyzer, not shown in FIG. 2, in front of the particle filter to convert at least a portion of the nitrogen monoxide present in the exhaust gas into nitrogen dioxide according to reaction (2). The oxidation catalyzer must also be located upstream of the place where the reducing agent is added to the exhaust gas flow because otherwise the reducing agent oxidizes and would be unusable for the SCR reaction.

In contact with the filter cake 13, the nitrogen dioxide in the exhaust gas causes a conversion of the soot particles 10 to CO, $CO_2$, $N_2$ and NO according to reactions (4), (5) and (6). These reactions run continuously so that the filter cake can be maintained at a substantially constant thickness and the exhaust gas counterpressure caused by it can be kept at a substantially constant level.

As an alternative to the continuous regeneration of the particle filter, it is also possible to regenerate the particle filter periodically. For this purpose, the hydrocarbon content in the exhaust gas is increased in a known manner so that these hydrocarbons coming into contact with the filter cake 13 oxidize the soot particles in a highly exothermal reaction in a known manner.

Figure 3:
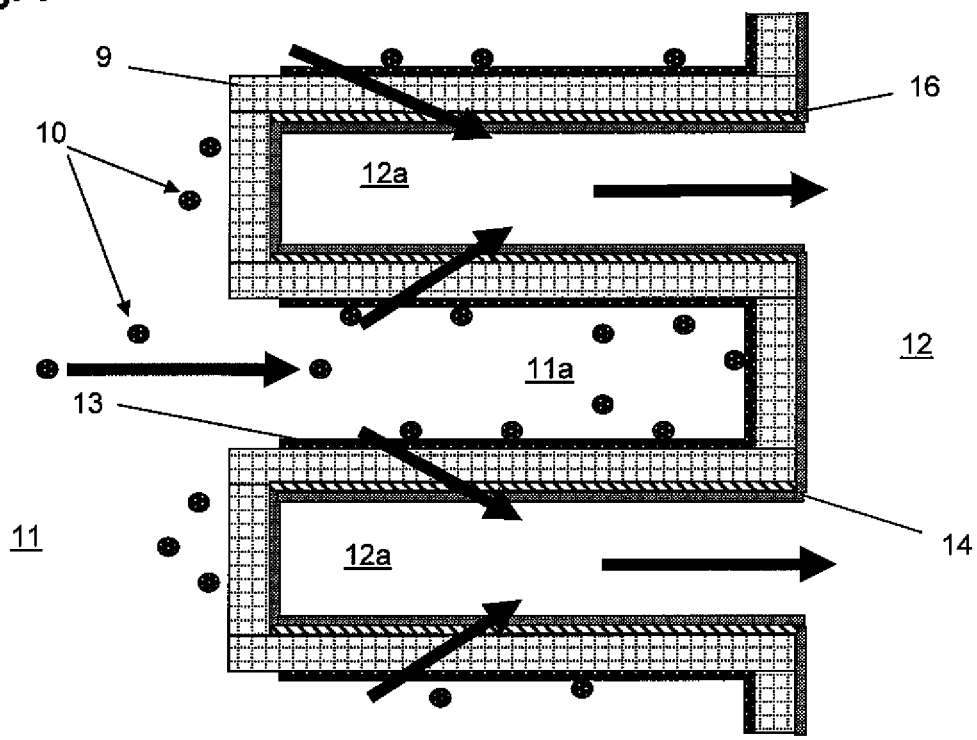
FIG. 3 shows a particle filter with a transition metal-containing catalyzer and a molecular sieve layer on the purified gas side.

The output side is shielded relatively well by the filter material from the local temperature increase caused at the input side 11 of the particle filter layer 9 in both ways of regenerating the particle filter and it may be useful to apply the SCR coating to the purified gas side of the particle filter instead of on the raw gas side. An arrangement of this kind is shown schematically in FIG. 3. This is also a sectional view in which the section plane runs parallel to the flow direction of the exhaust gas. Since the view in FIG. 3 is largely identical to that in FIG. 2, identical parts are given the same reference numbers. To avoid repetition, these identical parts are not described again; reference is had to the description referring to FIG. 2.

In FIG. 3, the SCR catalyzer layer 16 and the molecular sieve layer 14 are arranged on the output side, that is, the purified gas side 12, of the particle filter 9. The molecular sieve layer 14 is positioned between the SCR catalyzer layer 16 and the throughflow chambers 12a on the purified gas side. The molecular sieve layer 14 and the SCR catalyzer layer 16 form a constructional unit which cannot be separated again without destroying it.

Possibilities for producing the basic body of the particle filter will be shown by way of example and in principle referring to FIG. 3. In order to generate a blind hole-shaped structure, a plurality of tubular shapes can be combined to form a dense package, and adjacent tubes are closed alternately either on the input side or on the output side. The tubes can be closed using the same material that is used for the particle filter. But the material can also be different, e.g., neutral and/or tight against gas. Another possibility for generating the blind hole-shaped chambers 11a, 12a is to provide channels in a block-like filter body, the ends of the channels being closed adjacent to one another in an alternating manner at opposite ends.

Charging with SCR-active catalyzer material and the construction of the molecular sieve can be carried out in the structures mentioned above in that only every second opening on the output side 12 is closed initially and the filter body is then immersed in a coating solution or impregnating solution so that the coating solution or impregnating solution rises into the channels opening toward the output side. After the coating or impregnation has been carried out, the excess coating solution or impregnating solution is blown off and the coated or impregnated channels are then closed toward the input side 11.

A possibility for producing pocket-shaped structures is to fashion packages of spaced apart plates, wherein the adjacent free spaces formed by spacing apart are closed alternately on the input side 11 and output side 12 so that a pocket-shaped structure is formed. The output side 12 can be charged with SCR-active catalyzer material and molecular sieve material by charging the plates used for building the structure with SCR-active catalyzer material and layering the plates so that two charged plate sides and two uncharged plate sides lie opposite one another in an alternating manner. The charging of the plates can be carried out in that the plates are built in layers and the degree to which the layers are charged with SCR-active catalyzer material increases in direction of the output side. However, it is also possible to charge the plates by spraying or painting with molecular sieve material and/or SCR-active coating solutions or SCR-active impregnating solutions.

Since a separate layer for oxidizing PCDD, PCDF or hydrocarbons is missing in FIG. 3, the SCR catalyzer layer 16 and/or the molecular sieve layer 14 must be provided with corresponding oxidation activity.

Figure 4:
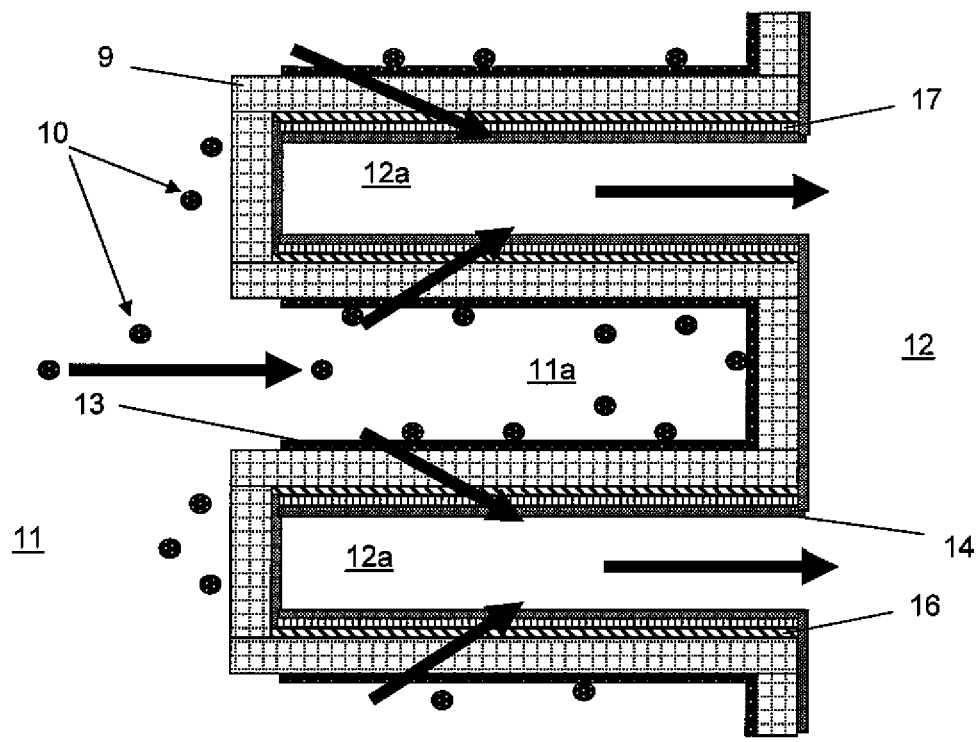
FIG. 4 shows a particle filter with a transition metal-containing catalyzer and a molecular sieve layer on the purified gas side and a layer with hydrocarbon oxidation layer, PCDD oxidation layer and PCDF oxidation layer between the catalyzer layer and the molecular sieve layer.

FIG. 4 shows a construction which is approximately identical to that shown in FIG. 3, the only difference being that a layer 17 with oxidation activity for PCDD, PCDF and/or hydrocarbons is arranged between the SCR catalyzer layer 16 and the molecular sieve layer 14 in order to prevent blockage of the molecular sieve by dioxins, furans or hydrocarbons. The layer 17 preferably has a porosity similar to that of the SCR catalyzer layer 16 or particle filter layer 9.

Figure 5:
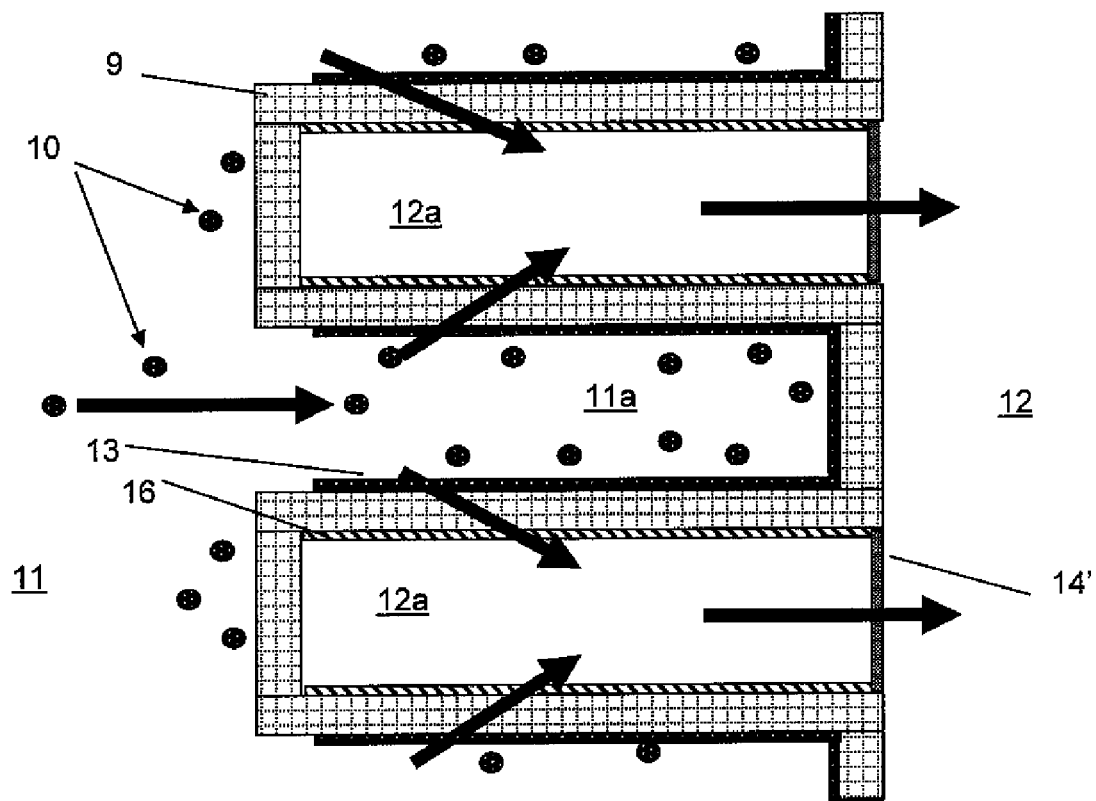
FIG. 5 shows a particle filter with a transition metal-containing catalyzer on the purified gas side and a molecular sieve layer at the output of the purified gas side.

Another embodiment form of the exhaust gas after-treatment system according to the invention is shown schematically in FIG. 5 in section. In this case, the chambers 12a on the purified gas side are separated from the purified gas side 12 downstream of the particle filter by molecular sieve arrangements 14'. They can be arranged on a suitable, e.g., metal or ceramic, support to increase mechanical strength.

Of course, it is also possible to construct the molecular sieve as a separate structural component part arranged between the transition metal-containing SCR catalyzer and the outlet of the exhaust gas into the environment. In this case, it is useful to provide the molecular sieve with PCDD oxidation activity, PCDF oxidation activity and/or hydrocarbon oxidation activity to bring about the decomposition of these substances and prevent blockage of the molecular sieve.

Of course, the constructions described above can be carried out in a variety of ways based on the know-how of the person skilled in the art without departing from the basic inventive idea. Within this meaning, the embodiment forms described above are given by way of example.

The invention is not limited by the embodiments described above which are presented as examples only but can be modified in various ways within the scope of protection defined by the appended patent claims.

I claim:

1. Apparatus for installation in an exhaust gas line of an internal combustion engine, the exhaust gas line having an input and an output, the apparatus comprising:
    a particle filter;
    a transition metal-containing catalyzer arranged on the particle filter;
    a molecular sieve arranged between the transition metal-containing catalyzer and the output, the molecular sieve having pore diameters in the range between 3 Å and 12 Å; and
    means for oxidizing at least one of hydrocarbons, polychlorinated dibenzodioxins, and polychlorinated dibenzofurans upstream of the molecular sieve.

2. The apparatus of claim 1 wherein
    the transition metal-containing catalyzer is arranged on the particle filter between the particle filter and the input; and
    the molecular sieve comprises a molecular sieve layer on the particle filter between the particle filter and the output.

3. The apparatus of claim 1 wherein
    the transition metal-containing catalyzer is arranged on the particle filter between the particle filter and the output; and
    the molecular sieve is comprises a molecular sieve layer arranged on the transition metal-containing catalyzer between the transition metal-containing catalyzer and the output.

4. The apparatus of claim 1 wherein the particle filter comprises at least one of metal, sintered metal, ceramic, foam, ceramic fibers, quartz fibers,
    glass fibers, silicon carbide, and aluminum titanate.

5. The apparatus of claim 1 wherein the transition metal-containing catalyzer contains at least one transition metal selected from the group consisting of copper, iron, and cobalt.

6. The apparatus of claim 1 wherein the transition metal-containing catalyzer is a catalyzer for the selective catalytic reduction of nitric oxides in the exhaust gas by means of at least one of ammonia and reducing agents split off from ammonia.

7. The apparatus of claim 1 wherein the transition metal-containing catalyzer contains zeolite.

8. The apparatus of claim 7 wherein the zeolite is one of an MFI zeolite and a BEA zeolite.

9. The apparatus of claim 1 wherein the molecular sieve is based on at least one of zeolites, silicates, metal silicates, aluminates, metal aluminates, silicophosphates, metal silicophosphates, silicoaluminophosphates, aluminophosphates, metal aluminophosphates, and aluminum silicates.

10. The apparatus of claim 1 wherein the molecular sieve comprises at least one zeolite framework selected from the group consisting of AEN, OSI, EPI, ERI, FAU, OFF, MFI, LTL, VFI, MAZ, MEI, EMT, CHA, KFI, BEA, MFS, MEL, MTW, EUO, MTT, HEU, FER, TON, and MOR.

11. The apparatus of claim 1 wherein the molecular sieve comprises at least one zeolite selected from the group consisting of Mordenite, Epistilbite, Chabazite, Erionite, Mazzite, Ferrierite, Faujasite, Offretite, ZSM-3, ZSM-4, ZSM-5, ZSM-12, ZSM-18, ZSM-20, ZSM-22, ZSM-23, ZSM-34, ZSM-35, ZSM-38, ZSM-48, ZSM-50, Omega, Beta, Zeolite A, Zeolite L, Zeolite Y, Zeolite X, ZK-4, ZK-5, ZK-14, ZK-20, ZK-21, and ZK-22.

12. The apparatus of claim 1 wherein the transition metal-containing catalyzer has at least one of a higher porosity and a larger average pore size than the molecular sieve.

13. The apparatus of claim 1 wherein the means for oxidizing at least one of hydrocarbons, polychlorinated dibenzodioxins, and polychlorinated dibenzofurans is provided on the molecular sieve.

14. The apparatus of claim 1 wherein the means for oxidizing at least one of hydrocarbons, polychlorinated dibenzodioxins, and polychlorinated dibenzofurans is provided on the surface transition metal-containing catalyzer.

15. The apparatus of claim 1 wherein the means for oxidizing at least one of hydrocarbons, polychlorinated dibenzodioxins, and polychlorinated dibenzofurans is provided as a discrete layer between the transition metal-containing catalyzer and the molecular sieve.

16. The apparatus of claim 1 wherein the means for oxidizing at least one of hydrocarbons, polychlorinated dibenzodioxins, and polychlorinated dibenzofurans contains at least one element selected from the group consisting of the platinum group, tungsten, titanium, lanthanum, molybdenum, cerium, manganese, and vanadium.

17. The apparatus of claim 1 wherein at least two of the means for oxidizing at least one of hydrocarbons, polychlorinated dibenzodioxins, and polychlorinated dibenzofurans; the transition metal-containing catalyzer; and the molecular sieve are connected and cannot be separated without being destroyed.

18. The apparatus of claim 1 wherein at least one of the means for oxidizing at least one of hydrocarbons, polychlorinated dibenzodioxins, and polychlorinated dibenzofurans; the transition metal-containing catalyzer; and the molecular sieve is arranged on a separate structural component.

19. The apparatus of claim 1 wherein the molecular sieve has a thickness between least 3 Å and 5 µm.

20. The apparatus of claim 1 wherein the transition metal-containing catalyzer is a layer arranged on the particle filter, the layer having a thickness of 5 µm to 500 µm.

21. The apparatus of claim 1 wherein the means for oxidizing is arranged at the upstream side of the molecular sieve.

22. A method for producing an apparatus for installation in the exhaust gas line of an internal combustion engine, the exhaust gas line having an inlet and an outlet, the method comprising:
providing a particle filter;
coating the particle filter with a layer containing a transition metal-containing catalyzer; and
arranging on the transition metal-containing catalyzer a layer constituting a molecular sieve, the molecular sieve having pore diameters in the range between 3 Å and 12 Å.

23. The method of claim 22 wherein the particle filter is a ceramic or metal particle filter, the method further comprising changing the concentration of at least one transition metal in a surface of the catalyzer facing the output by ion exchange for a metal which can oxidize at least one of hydrocarbons, polychlorinated dibenzodioxins, and polychlorinated dibenzofurans, the surface being arranged at an upstream side of the molecular sieve.

* * * * *